US011403545B2

United States Patent
Wang et al.

(10) Patent No.: US 11,403,545 B2
(45) Date of Patent: Aug. 2, 2022

(54) PATTERN RECOGNITION APPARATUS, METHOD, AND PROGRAM

(71) Applicant: NEC Corporation, Tokyo (JP)

(72) Inventors: Qiongqiong Wang, Tokyo (JP); Takafumi Koshinaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 5 days.

(21) Appl. No.: 16/476,319

(22) PCT Filed: Mar. 9, 2017

(86) PCT No.: PCT/JP2017/009481
§ 371 (c)(1),
(2) Date: Jul. 8, 2019

(87) PCT Pub. No.: WO2018/163352
PCT Pub. Date: Sep. 13, 2018

(65) Prior Publication Data
US 2019/0347565 A1  Nov. 14, 2019

(51) Int. Cl.
*G06N 20/10* (2019.01)
*G06N 7/00* (2006.01)

(52) U.S. Cl.
CPC ............ *G06N 7/005* (2013.01); *G06N 20/10* (2019.01)

(58) Field of Classification Search
CPC ........ G06N 20/10; G06N 7/005; G06N 20/00; G06N 7/00; G10L 17/00
See application file for complete search history.

(56) References Cited

U.S. PATENT DOCUMENTS 9,865,266 B2 * 1/2018 Colibro .................. G10L 17/06
2014/0358541 A1 * 12/2014 Colibro ................ G10L 15/063
704/245

FOREIGN PATENT DOCUMENTS

JP        2013-20290 A      1/2013

OTHER PUBLICATIONS

Chen, Minmin, Kilian Q. Weinberger, and John Blitzer. "Co-training for domain adaptation." Advances in neural information processing systems. 2011. (Year: 2011).*
Novoselov, Sergey, Timur Pekhovsky, and Konstantin Simonchik. "STC Speaker Recognition System for the NIST i-Vector Challenge." Odyssey. 2014. (Year: 2014).*
Rohdin, Johan, Sangeeta Biswas, and Koichi Shinoda. "Robust discriminative training against data insufficiency in PLDA-based speaker verification." Computer Speech & Language 35 (2016): 32-57. (Year: 2016).*

(Continued)

*Primary Examiner* — Michael J Huntley
*Assistant Examiner* — Adam C Standke
(74) *Attorney, Agent, or Firm* — Sughrue Mion, PLLC

(57) ABSTRACT

A pattern recognition apparatus for discriminative training includes: a similarity calculator that calculates similarities among training data; a statistics calculator that calculates statistics from the similarities in accordance with current labels for the training data; and a discriminative probabilistic linear discriminant analysis (PLDA) trainer that receives the training data, the statistics of the training data, the current labels and PLDA parameters, and updates the PLDA parameters and the labels of the training data.

6 Claims, 8 Drawing Sheets

(56) References Cited

OTHER PUBLICATIONS

Novoselov, Sergey, Timur Pekhovsky, and Konstantin Simonchik. "STC Speaker Recognition System for the NIST i-Vector Challenge." Odyssey. (Year: 2014).*
Chen, Minmin, Kilian Q. Weinberger, and John Blitzer. "Co-training for domain adaptation." Advances in neural information processing systems. (Year: 2011).*
Rohdin, Johan, Sangeeta Biswas, and Koichi Shinoda. "Robust discriminative training against data insufficiency in PLDA-based speaker verification." Computer Speech & Language 35: 32-57. (Year: 2015).*
Burget et al., "Discriminatively Trained Probabilistic Linear Discriminant Analysis for Speaker Verification," ICASSP 2011, pp. 4832-4835 (total 4 pages).
Novoselov et al., "STC Speaker Recognition System for the NIST i-Vector Challenge," Odyssey 2014, Jun. 16-19, 2014, pp. 231-240 (total 10 pages).
Wang et al., "Domain Adaptation Using Maximum Likelihood Linear Transformation for PLDA-Based Speaker Verification", 2016 IEEE International Conference on Acoustics, Speech and Signal Processing (ICASSP) [online], 2016, pp. 5110-5114 (total 6 pages).
International Search Report for PCT/JP2017/009481 dated Jun. 6, 2017 [PCT/ISA/210].
Written Opinion of the International Searching Authority for PCT/JP2017/009481 dated Jun. 6, 2017 [PCT/ISA/237].

\* cited by examiner

PATTERN RECOGNITION APPARATUS, METHOD, AND PROGRAM

This application is a National Stage Entry of PCT/JP2017/009481 filed on Mar. 9, 2017, the contents of all of which are incorporated herein by reference, in their entirety.

TECHNICAL FIELD

The present invention relates to a pattern recognition apparatus, method, and program for calculating similarity among patterns such as images, videos, speech and audio, and further classifying them to one of certain classes if needed.

BACKGROUND ART

Pattern recognition systems have their basis on machine learning theories and techniques, and have been widely applied to our daily life to solve real problems in such diverse areas as science, engineering, agriculture, e-commerce, medicine, medical imaging analysis, military, and national security.

One important technique in pattern recognition is probabilistic linear discriminant analysis (PLDA) which compensates within-class variability and provides a powerful data-driven mechanism to separate class-specific factors from other irrelevant ones. With PLDA, we can build a model of a previously unseen class from a single example, and can combine multiple examples for a better representation of the class. PLDA has been proved effective in face recognition, speaker recognition, and so forth.

However, it is found that prior model assumptions in PLDA are not accurate. It assumes the prior probability of class variables and conditional probabilities of feature vectors (extracted from given patterns) are both Gaussian, but in practice, the data distribution often tends to be heavy-tailed. Whenever there is a mismatch between models and data, discriminative training (DT) improves the performance. Discriminatively trained PLDA (DT-PLDA) aims to optimize all the parameters of the PLDA in its score function. "Score" refers to one kind of similarity measures in terms of a likelihood ratio of a pair of patterns being from the same class to being from different classes. So DT-PLDA solves the problem of PLDA's inaccurate model assumption, and has more discriminative power.

In spite of the success of DT-PLDA, it has strict condition that it needs a large amount of matched labeled data, since DT-PLDA can fit almost any label set and easily over-fit. "Label" in this document refers to "target" or "non-target". If data are from the same class, they are labeled as "target". Otherwise, they are labeled as "non-target". So DT-PLDA is less robust than the related PLDA against domain mismatch which often exists in real applications. "Domain" in this document refers to various conditions of data, including language difference, channel difference, SNR (signal noise ratio) difference in the case of speaker recognition, and illumination difference, pose difference, SNR in the case of face recognition. In reality, there often exists a large amount of data matched with the target domain. But most of them are unlabeled. So they also cannot be used in DT-PLDA. How to utilize the rich-resource unlabeled data remains to be a challenging problem.

NPL1 discloses a technology of discriminatively trained PLDA (DT-PLDA). It outperformed the related generatively trained PLDA.

NPL 2 discloses a technology of agglomerative clustering 302 (in FIG. 8) in feature space as a clustering algorithm to make labels for data 303, and then apply supervised PLDA training 304 and store PLDA parameters 305. In testing phase, given an enrolment data and testing data, PLDA classifier 306 gives the answer of "target/non-target".

CITATION LIST

Non Patent Literature

NPL 1:
L. Burget, O. Plchot, S. Cumani, O. Glembek, P. Matejka, N. and Brummer, "Discriminatively trained probabilistic linear discriminant analysis for speaker verification," ICASSP 2011

NPL 2:
S. Novoselov, T. Pekhovsky and K. Simonchik, "STC Speaker Recognition System for the NIST i-Vector Challenge," Odyssey 2014

SUMMARY OF INVENTION

Technical Problem

However, NPL1 can only work when a large amount of data with labels is available. NPL 2 introduces extra error produced in clustering to PLDA training. Thus the PLDA trained with unreliable labels cannot produce a reliable decision (Target/Non-target) in evaluation. It is especially harmful for DT-PLDA due to mislabeling, as discriminative learning can fit almost any label set.

The present invention is made in view of the above mentioned situation, and the object of the present invention is to provide a more accurate and reliable simultaneous estimation of labels and a DT-PLDA model, which gives robustness against mislabeling and reaches a global optimization with constraint of a regularization derived from data statistics. So the labels are more reliably made with higher robustness, and the DT-PLDA is less directly dependent on labeling. Thus, it solves the problem of using unlabeled data in DT-PLDA, the above mentioned problem the related arts have.

Solution to Problem

In order to solve the above-mentioned problem, a first example aspect of the present invention is a pattern recognition apparatus for discriminative training comprising: a similarity calculator that calculates similarities among training data; a statistics calculator that calculates statistics from the said similarities in accordance with current labels for the training data; and a discriminative probabilistic linear discriminant analysis (PLDA) trainer that receives the training data, the statistics of the training data, the said current labels and PLDA parameters, and updates the PLDA parameters and the labels of the training data.

A second example aspect of the present invention is a pattern recognition method comprising: calculating similarities among training data; calculating statistics from the said similarities in accordance with current labels for the training data; and receiving the training data, the statistics of the training data, the said current labels and probabilistic linear discriminant analysis (PLDA) parameters to update the PLDA parameters and the labels of the training data.

Advantageous Effects of Invention

According to the present invention, labels of unlabeled data and DT-PLDA parameters are more accurately and reliably estimated simultaneously, using a single criterion to reach global optimization. Unlike the related art where DT-PLDA training is directly dependent on the labels made by clustering, the present invention trains DT-PLDA directly from data, so that the harm due to mislabeling is alleviated. Thus, a more appropriate method utilizing existing unlabeled data is provided.

DESCRIPTION OF EMBODIMENTS

Figure 1:
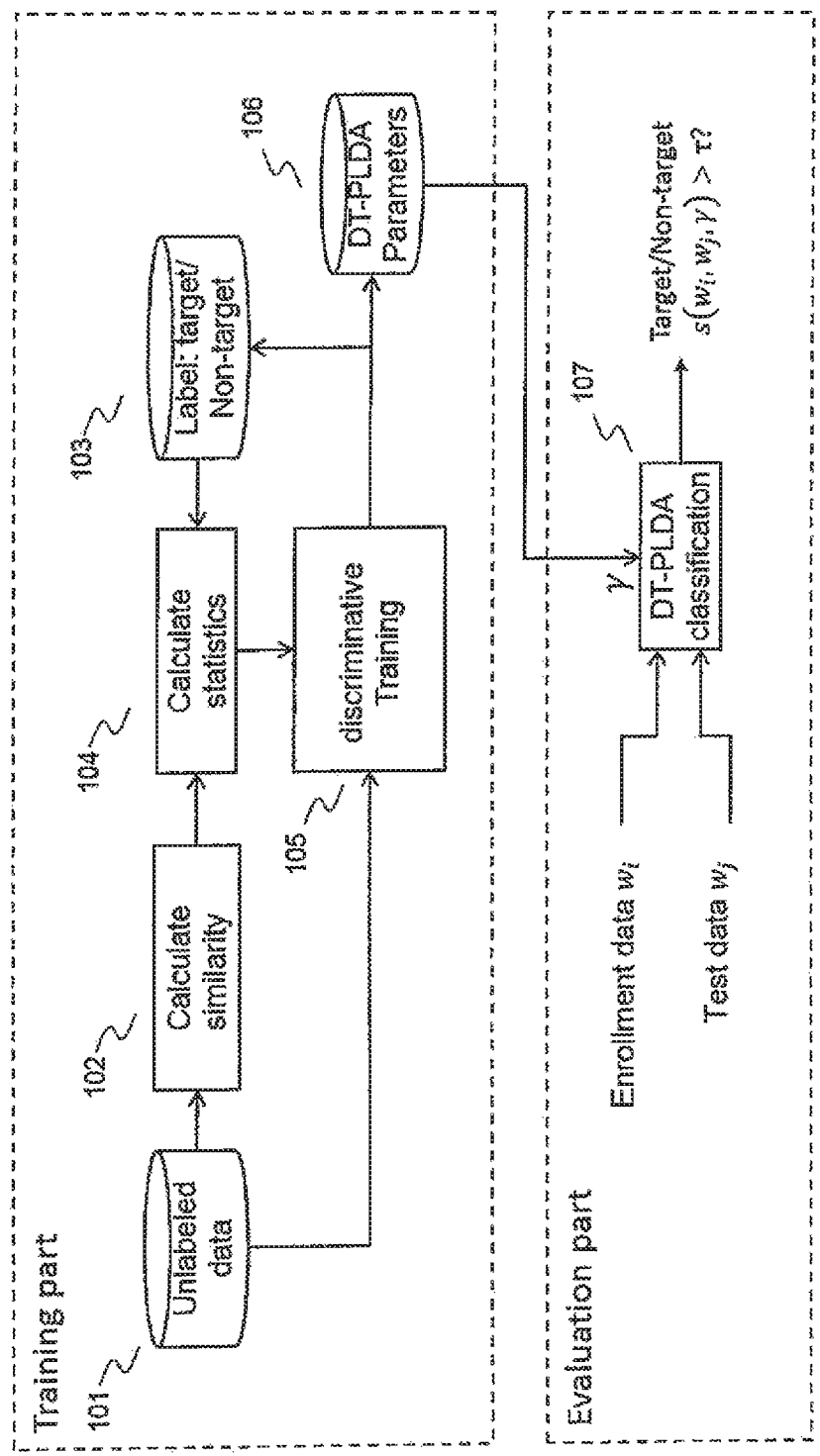
FIG. 1 is a block diagram according to the first example embodiment of the present invention—unsupervised DT-PLDA.

Skilled artisans will appreciate that elements in the figures are illustrated for simplicity and clarity and have not necessarily been drawn to scale. For example, the dimensions of some of the elements in the figures illustrating integrated circuit architecture may be exaggerated relative to other elements to help to improve understanding of the present and alternate exemplary embodiments.

Each example embodiment of the present invention will be described below with reference to the drawing. The following detailed descriptions are merely exemplary in nature and are not intended to limit the invention or the application and uses of the invention. Furthermore, there is no intention to be bound by any theory presented in the preceding background of the invention or the following detailed description.

First Example Embodiment

FIG. 1 illustrates a block diagram of the first example embodiment of the present invention. According to the figure, it comprises a similarity calculator 102, a statistics calculator 104, a discriminative trainer 105, and a DT-PLDA classifier 107.

In the training part, the similarity calculator 102 first calculates the similarities between all or part of combinations of data stored in an unlabeled data storage 101. Then with an initial label set stored in a label storage 103—labels of "target" or "non-target" for each combination, the statistics calculator 104 calculates the statistics of those with "target" and "non-target" labels respectively. The similarity here can be cosine similarity, or a score given by any other PLDA models, e.g. generatively trained PLDA, or given by different classifiers such as SVM. And the statistics here can be mean, variance and so on. Formulation of one example will be shown in [0021]-[0023]. With sets of feature vectors and the similarity statistics (ex. mean of cosine similarities among target trials and mean of cosine similarities among non-target trials), unsupervised DT-PLDA trainer 105 estimates (and updates from the second iteration) DT-PLDA parameters and labels ("target" or "non-target"). And they are stored in a DT-PLDA parameter storage 106, and a label storage 103. This procedure is operated iteratively, until the training gets converged. In the evaluation part, the DT-PLDA classifier 107 receives DT-PLDA parameters trained in the development training part, test and enrollment data, and then classifies whether the test data and the enrolment data are from the same class by comparing the classification score (in terms of a likelihood ratio of the data being from the same speaker to being from different speakers) with a pre-determined threshold. If the score is larger than the threshold, the classifier gives an answer "target"; otherwise, it gives "non-target".

Figure 2:
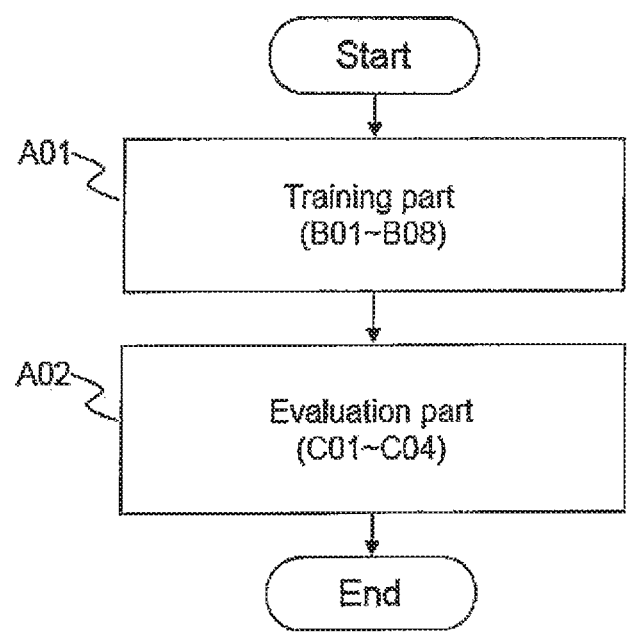
FIG. 2 is a figure showing an example of a whole operation flowcharts shown in FIG. 1.

FIG. 2 is a whole operation flowchart of the first example embodiment of the present invention described in [0015]-[0016] using FIG. 1. It includes the training part A01 shown in detail in FIG. 3, and the evaluation part A02 shown in detail in FIG. 4.

Figure 3:
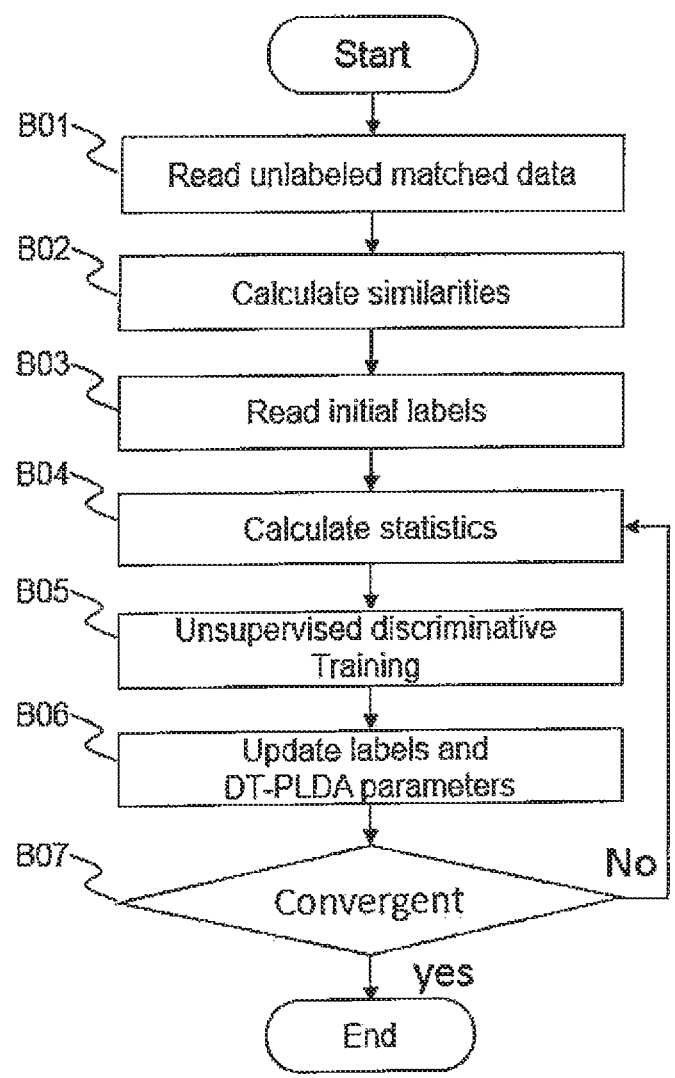
FIG. 3 is a flowchart illustrating an example embodiment of the present invention: DT-PLDA parameters are trained using unlabeled data.

FIG. 3 is a flowchart of the first example embodiment of the present invention. This shows the training part of the example embodiment (A01). First, the similarity calculator 102 reads unlabeled data from a storage 101 (B01), and calculates similarities among the combinations of the unlabeled data (B02). Secondly, the statistics calculator 104 reads the labels stored in a label storage 103 (B03), and calculates the statistics of the similarities of data with "target" labels and of those with "non-target" labels (B04). Then, with the data, statistics and temporal labels, DT-PLDA is trained by the discriminative trainer 105 (B05). And the temporal labels for the unlabeled data are updated (B06) and stored in the label storage 103. At the same time, DT-PLDA parameters are updated and stored in the DT-PLDA parameter storage 106. After that, it is checked whether the training gets converged by using some convergent criterion (B07), for example, the change in parameters from those in the last iteration is smaller than a pre-determined percentage, other examples of convergence can be changes of labels, change of the objective function value, and so on. If it converged, the training procedure is finished. If not, statistics will be calculated again according to new labels in the label storage 103 (B04) and continue to DT-PLDA training (B06) with new statistics.

Figure 4:
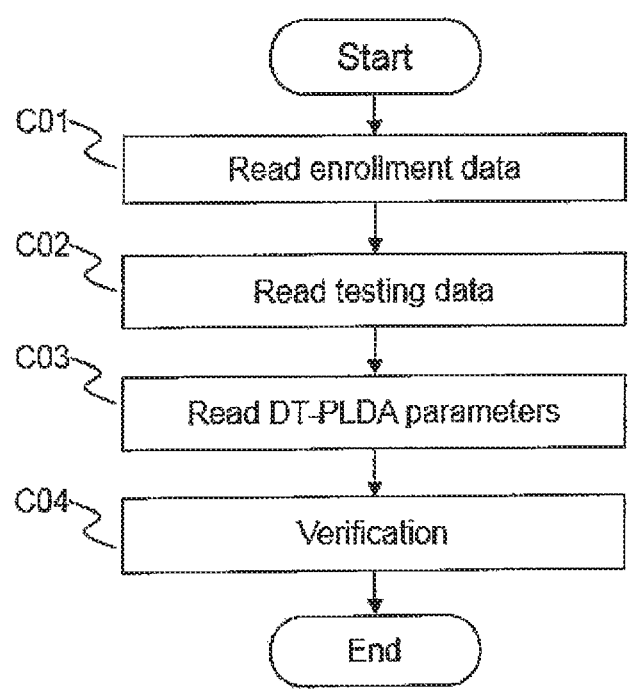
FIG. 4 is a flowchart illustrating an example embodiment of the present invention shown in FIG. 1 and FIG. 5: evaluation part of DT-PLDA classification.

FIG. 4 is another flowchart of the first example embodiment of the present invention. This shows the evaluation part of the example embodiment (A02). First, the DT-PLDA classifier 107 reads an enrollment data (C01) and a testing data (C02), and also reads DT-PLDA parameters stored in the DT-PLDA parameter storage 106 (C03). Note that the order of C01-C03 can be switched, not limited to the form presented in FIG. 4. Then, it gives answer of "target" or "non-target".

The present invention is based on the assumptions that data with high similarity are likely to be from the same class and vice versa. Such data statistics are applied in the objective function in unsupervised training of DT-PLDA, to constrain unsupervised training not to go to extreme solutions caused by over-fitting.

The objective function LL is intended to minimize the cost for misrecognition L with a regularization term D derived from data statistics.

$$LL(\gamma) = L(\gamma) + bD(\gamma) \quad \text{[Math. 1]}$$

$$L(\gamma) = \sum_{i,j:e_{i,j}=1} a_1 l(e_{i,j}, s(w_i, w_j, \gamma), \tau) + \sum_{i,j:e_{i,j}=-1} a_2 l(e_{i,j}, s(w_i, w_j, \gamma), \tau)$$

Where $$\gamma \quad \text{[Math. 2]}$$

represents DT-PLDA parameters; $w_i$, $w_j$ are feature vectors of training data; $e_{i,j}$ is a hypothesized label—"target" or "non-target" for feature vectors $w_i$ and $w_j$, and the label was produced according to DT-PLDA in the last iteration.

$$\tau \quad \text{[Math. 3]}$$

is a pre-determined threshold; and $$s(w_i, w_j, \gamma) \quad \text{[Math. 4]}$$

is the similarity score (likelihood ratio) of $w_i$ and $w_j$ being likely from the same speaker, given by a DT-PLDA model $$\gamma. \quad \text{[Math. 5]}$$

b is the weight of the regularization term $$D(\gamma) \quad \text{[Math. 6]}$$

in the objective function. By controlling b, we can adjust how much constraint to give in the training. For example, b is set as a bigger value at the beginning of the training when the labels are not reliable enough, so that the training is more dependent on data statistics, and becomes smaller after more iterations of training. Alternatively, b can be set constant.

One example of the first example embodiment is using cosine similarity as the similarity calculated in the similarity calculator 102, and mean as the data statistics calculated in the statistics calculator 104. So here cosine means are used in the regularization to constrain the iterative training, $$D(\gamma) = -\frac{1}{n^+} \sum_{i,j:s_{ij}(\gamma)>\tau} C(w_i, w_j) + \frac{1}{n^-} \sum_{i,j:s_{ij}(\gamma)<\tau} C(w_i, w_j) \quad \text{[Math. 7]}$$

where $$C(w_i, w_j) = \frac{w_i w_j}{|w_i||w_j|}, \quad \text{[Math. 8]}$$

is the cosine similarity between two vectors $$w_i \text{ and } w_j; \quad \text{[Math. 9]}$$

$n^+$ presents the number of trials which has the label "target", and $n^-$ presents the number of trials which has the label "non-target". The regularization term subtracts cosine similarities of those whose scores of being from the same speaker is more than the pre-determined threshold $$\tau, \quad \text{[Math. 10]}$$

and adds the cosine similarity of those whose scores are less than the threshold. According to our assumption, data from the same class have high similarity so that their cosine similarities are large; data from different classes have low similarity so that their cosine similarities are small. To minimize the objective function, it allows the DT-PLDA model to give as many as possible correct scoring according to initial labels, at the same time constrained by the data statistics.

The optimization can be solved by a family of gradient-based optimization methods, for example, the heretofore known Limited (L)-BFGS algorithm. L-BFGS solves non-linear optimization problems with gradient, without computing Hessian matrix. The gradient of the objective function is $$\nabla_\gamma LL(\gamma) = \nabla_\gamma L(\gamma) + \nabla_\gamma D = \begin{bmatrix} 2vec(\Omega(G+K)\Omega^T) \\ 2vec([\Omega^\circ(1_A(G+K))]\Omega^T) \\ 2[\Omega^\circ(1_A(G+K))\Omega^\circ)]1_B \\ 1_B^T(G+K)1_B \end{bmatrix} \quad \text{[Math. 11]}$$

where $$vec(\cdot) \quad \text{[Math. 12]}$$

stacks the columns of a matrix into a column vector, $$\Omega = [w_1, \ldots w_n] \quad \text{[Math. 13]}$$
$1_A$: $d \times n$ matrix of ones
$1_B$: $n \times 1$ matrix of ones
$$G_{ij} = \frac{\partial L}{\partial s_{ij}} = \frac{-t_{ij}}{1+\exp(t_{ij}(s_{ij}-\tau))}$$
$$K_{ij} = \frac{\partial D}{\partial s_{ij}} = kC(w_i, w_j)\frac{\exp[-(s_{ij}-\tau)]}{(1+\exp[-(s_{ij}-\tau)])^2},$$
$$k = -\frac{1}{n^-} - \frac{1}{n^+}$$

$$t_{ij} \in \{-1, 1\} \quad \text{[Math. 14]}$$

is the label of a pair of feature vectors, i.e., it equals 1 if the two feature vectors are from the same class and −1 otherwise.

$$s_{ij} \quad \text{[Math. 15]}$$

is $$s(w_i, w_j, \gamma) \quad \text{[Math. 16]}$$

in short.

Effect of First Example Embodiment

As explained above, the pattern recognition apparatus according to the first example embodiment can assist to estimate more accurate and reliable DT-PLDA parameters. The reason is that the labels of unlabeled data and DT-PLDA model are estimated simultaneously, using a single criterion to reach a global optimization, with constraint of a regularization derived from data statistics. DT-PLDA training is directly dependent on data itself. So the harm due to mislabeling is mitigated in the present invention.

Second Example Embodiment

In the first example embodiment, DT-PLDA is trained with fully unlabeled data. However, in most of applications, there exists some amount of labeled matched data. They are usually not enough to train a DT-PLDA model by only themselves. Because they have true labels, including such data in training together with unlabeled data will improve reliability in labeling the unlabeled data and accuracy in DT-PLDA parameter estimation. In the second example embodiment, semi-supervised training which utilizes the existing labeled data is described.

Figure 5:
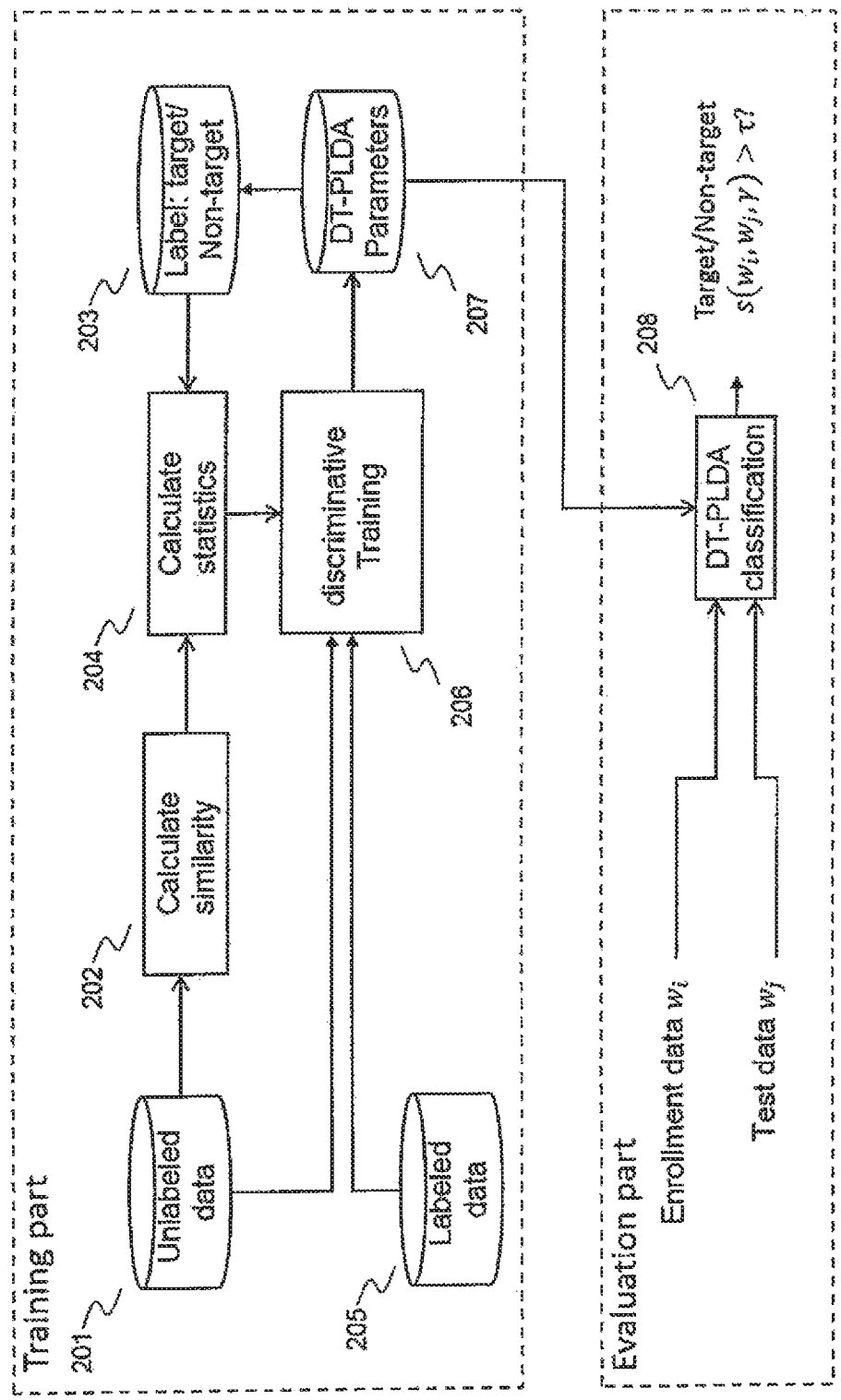
FIG. 5 is a block diagram according to the second example embodiment of the present invention—semi-supervised DT-PLDA.

FIG. 5 illustrates a block diagram of the second example embodiment of the present invention. According to the figure, it comprises a similarity calculator 202, a statistics calculator 204, a discriminative trainer 206, and a DT-PLDA classifier 208.

In the training part, the similarity calculator 202 first calculates the similarities between combinations of data stored in an unlabeled data storage 201. Then with a label set of the unlabeled data stored in a label storage 203—a label of "target" or "non-target" for each combination, the statistics calculator 204 calculates the statistics of those with "target" and "non-target" labels respectively, for the unlabeled data. The similarity here can be cosine similarity, or a score given by any other PLDA models, e.g. generatively trained PLDA, or given by different classifiers, such as SVM. With sets of feature vectors of the unlabeled data, their similarity statistics, feature vectors of labeled data stored in a labeled data storage 205, and their true labels, the DT-PLDA trainer 206 estimates (and updates from the second iteration) DT-PLDA parameters and labels ("target" or "non-target") for the unlabeled data. And they are stored in a DT-PLDA parameter storage 207 and the label storage 203. The labels of labeled data are not changed. This procedure is operated iteratively until the training get convergent. In the evaluation part, the DT-PLDA classifier 208 receives DT-PLDA parameters trained in the training part, and test and enrollment data, and then classifies whether the test data and the enrolment data are from the same class by comparing the classification score with a pre-determined threshold in the same way as the first example embodiment. If the score is larger than the threshold, the classifier gives an answer "target"; otherwise, it gives "non-target".

Figure 6:
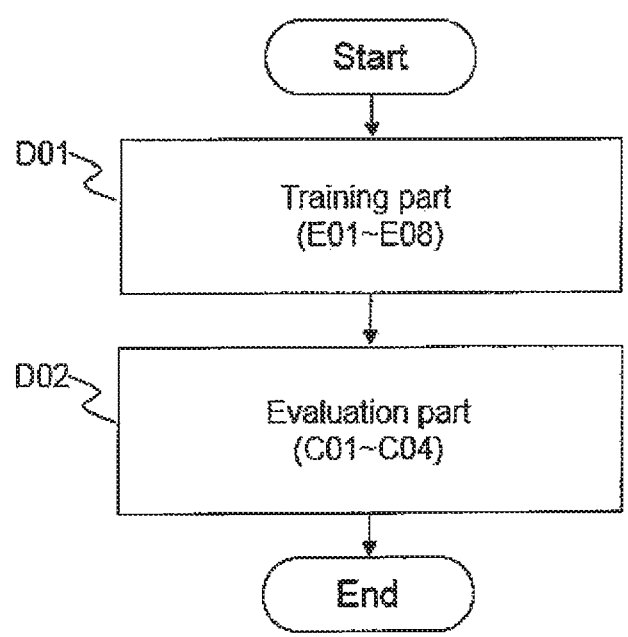
FIG. 6 is a figure showing an example of a whole operation flowcharts shown in FIG. 5.

FIG. 6 is a whole operation flowchart of the second example embodiment of the present invention described in [0026]-[0027] using FIG. 5. It includes the training part D01 shown in detail in FIG. 7, and the evaluation part D02 shown in detail in FIG. 4.

Figure 7:
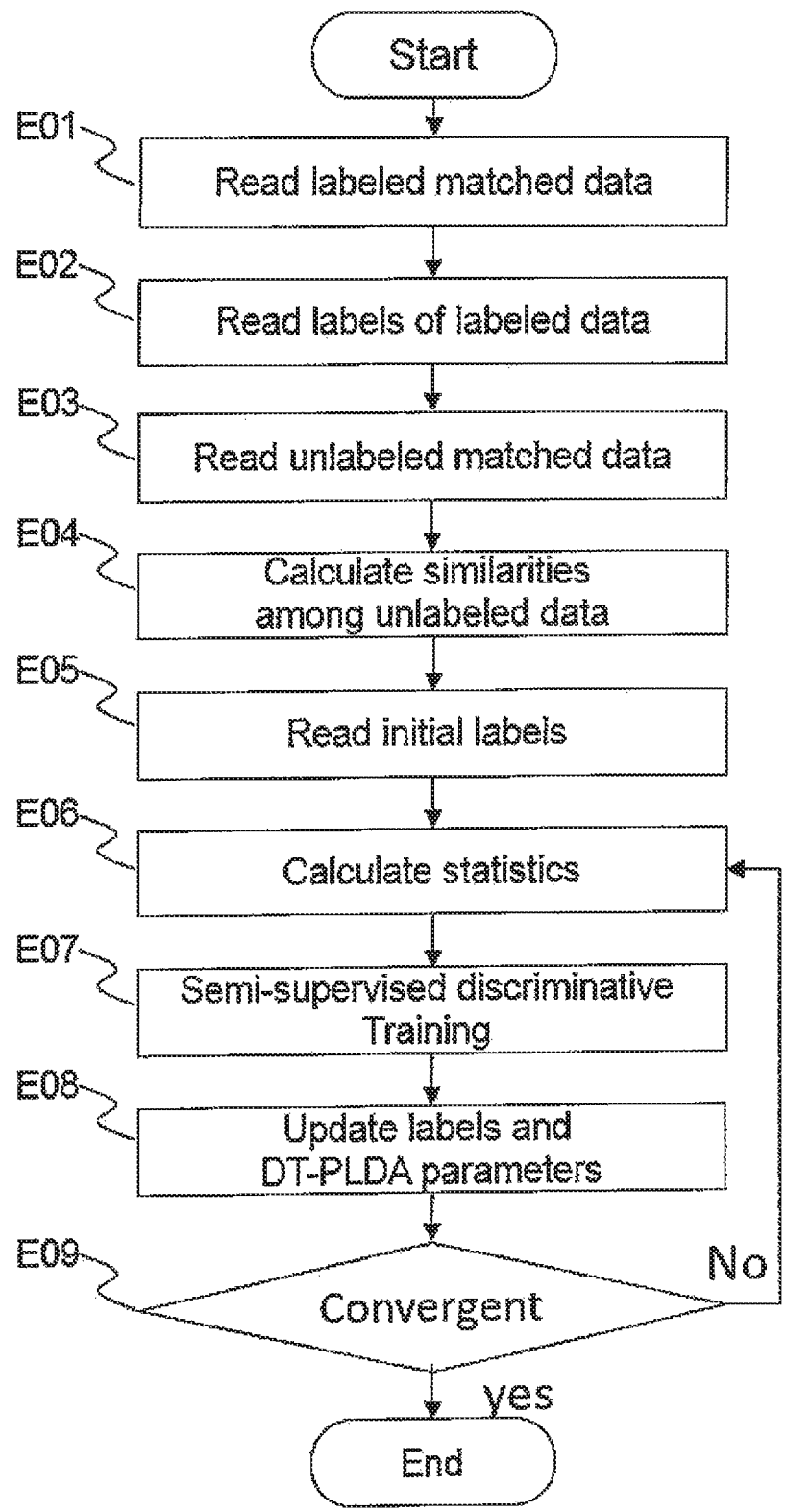
FIG. 7 is a flowchart illustrating an example embodiment of the present invention: DT-PLDA parameters are trained using unlabeled data and labeled data.
Figure 8:
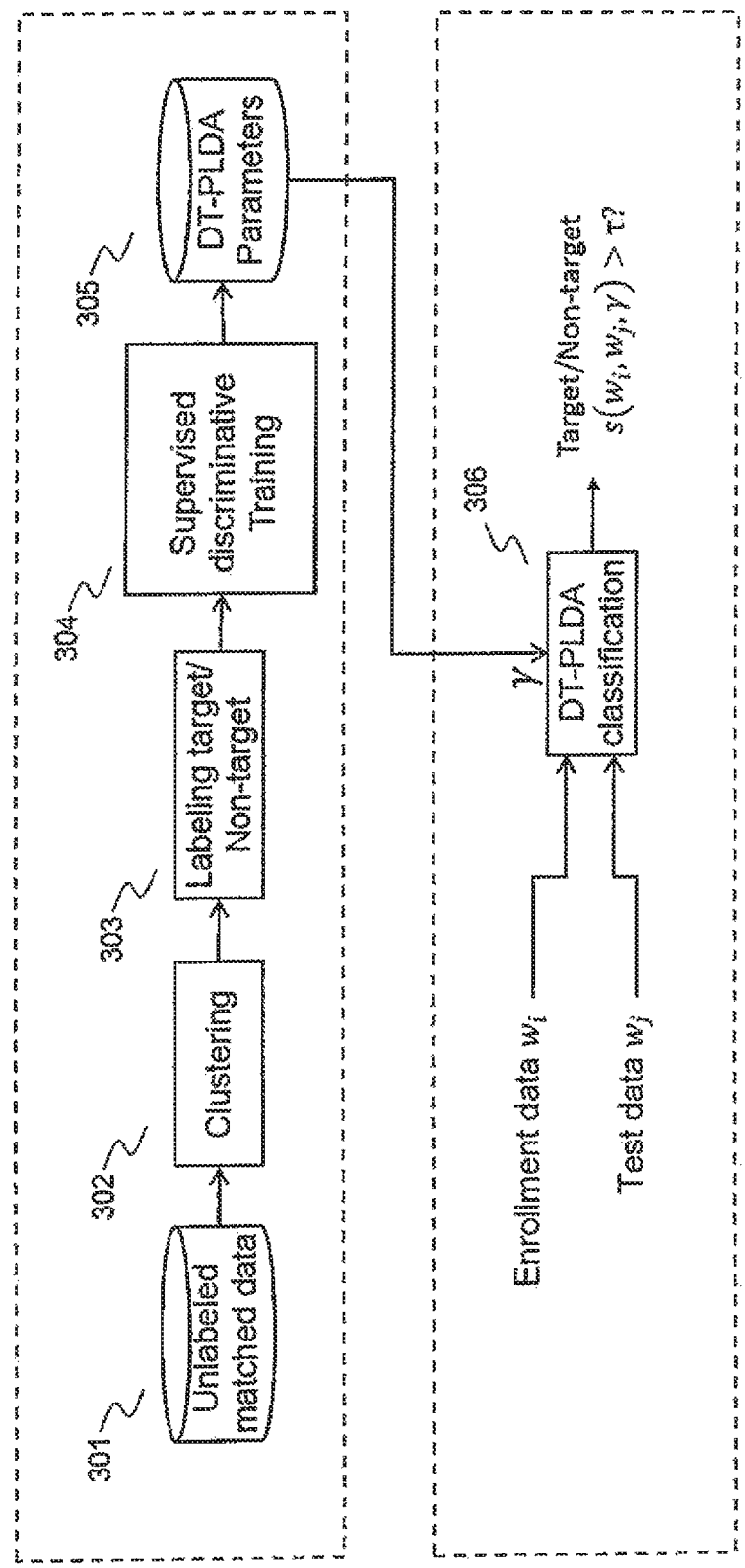
FIG. 8 is a block diagram of related art—clustering and PLDA.

FIG. 7 is a flowchart of the second example embodiment of the present invention. This shows the training part of the example embodiment (D01). First, a DT-PLDA trainer 206 reads labeled data stored in a labeled data storage 205 (E01), and reads their labels (E02). Secondly, a similarity calculator 202 reads unlabeled data from an unlabeled data storage 201 (E03), and calculates similarities among the combinations of the unlabeled data (E04). After that, the statistic calculator 204 reads labels stored in a label storage 203 (E05), and calculates the statistics of the similarities of data with "target" labels and of those with "non-target" labels, separately (E06). Then, with the labeled and unlabeled data, statistics and hypothesized labels of the unlabeled data, semi-supervised DT-PLDA is trained by the discriminative trainer 206 (E07). And the hypothesized labels for the unlabeled data are updated (E08) and stored in the label storage 203. At the same time, DT-PLDA parameters are updated (E08) and stored in the DT-PLDA parameter storage 207. After that, it is checked whether the training gets converged by using some convergent criterion (E09), for example, the change in parameters from those in the last iteration is smaller than a pre-determined percentage, other examples of convergence can be changes of labels, change of the objective function value, and so on. If it converged, the training procedure is finished. If not, statistics will be calculated again according to new labels in the label storage 203 (E06) and continue to semi-supervised DT-PLDA training (E07) with new statistics. Note that the order of E01-E02 and E03~E06 can be switched, not limited to the form presented in FIG. 7.

The flowchart of the second example embodiment of the present invention for the evaluation part is same as that in the first example embodiment. It is shown in FIG. 4.

As a final point, it should be clear that the process, techniques and methodology described and illustrated here are not limited or related to a particular apparatus. It can be implemented using a combination of components. Also various types of general purpose devise may be used in accordance with the instructions herein. The present invention has also been described using a particular set of examples. However, these are merely illustrative and not restrictive. For example the described software may be implemented in a wide variety of languages such as C/C++, Java, MATLAB and Python etc. Moreover other implementations of the inventive technology will be apparent to those skilled in the art.

What is claimed is:

1. A pattern recognition apparatus, for discriminative training for use in at least one of speaker recognition and face recognition, comprising:
   a processor; and
   a memory storing executable instructions that, when executed by the processor, cause the processor to perform as
   a. a similarity calculator configured to calculate similarities between all or part of combinations of unlabeled training data stored in an unlabeled data storage;
   b. a statistics calculator configured to perform a calculation of statistics of the similarities in accordance with current labels for unlabeled training data stored in a label storage, the label storage initially storing, as the current labels, initial labels which are classified into labels of "target" and labels of "non-target" for each combination; and
   c. a discriminative probabilistic linear discriminant analysis (PLDA) trainer configured to receive the unlabeled training data stored in the unlabeled data storage, the statistics calculated by the statistics calculator, the initial labels stored in the label storage and PLDA parameters stored in a parameter storage, to simultaneously perform an update of the PLDA parameters and the current labels for the unlabeled training data so as to minimize an objective function which is intended to minimize a cost for misrecognition with a regularization term derived from the statistics, and to store the updated PLDA parameters and the updated labels in the parameter storage and the label storage, respectively, the regularization term representing regularization in handling a noisy labeling problem,
   wherein the calculation by the statistics calculator and the update by the discriminative PLDA trainer are iterated until the discriminative training converges.

2. The apparatus according to claim 1, wherein the similarity calculator calculates at least one of cosine similarities, PLDA likelihood ratio scores, SVM scores, and negative p-norm including Euclidean distance.

3. The apparatus according to claim 1, wherein the statistics calculator calculates at least one of mean and variance of the similarities.

4. The apparatus according to claim 1, wherein the discriminative PLDA trainer receives, from a labeled data storage, labeled training data, part of which
have their true labels, and skips updating the labels for the labeled training data with the true labels.

5. A pattern recognition method performed by a pattern recognition apparatus for discriminative training for use in at least one of speaker recognition and face recognition, the pattern recognition method comprising:
- calculating similarities between all or part of combinations of unlabeled training data stored in an unlabeled data storage;
- performing a calculating of statistics of the similarities in accordance with current labels for unlabeled training data stored in a label storage, the label storage initially storing, as the current labels, initial labels which are classified into labels of "target" and labels of "non-target" for each combination; and
- receiving the unlabeled training data stored in the unlabeled data storage, the statistics, the initial labels stored in the label storage and probabilistic linear discriminant analysis (PLDA) parameters stored in a parameter storage, simultaneously performing an updating of the PLDA parameters and the current labels for the unlabeled training data so as to minimize an objective function which is intended to minimize a cost for misrecognition with a regularization term derived from the statistics, and storing the updated PLDA parameters and the updated labels in the parameter storage and the label storage, respectively, the regularization term representing regularization in handling a noisy labeling problem, wherein the calculating of the statistics the updating are iterated until the discriminative training converges.

6. A non-transitory computer readable recording medium for storing a pattern recognition program, for discriminative training for use in at least one of speaker recognition and face recognition, causing a computer to perform:
- a similarity calculator configured to calculate similarities between all or part of combinations of unlabeled training data stored in an unlabeled data storage;
- a statistics calculator configured to calculate statistics of the similarities in accordance with current labels for unlabeled training data stored in a label storage, the label storage initially storing, as the current labels, initial labels which are classified into labels of "target" and labels of "non-target" for each combination; and
- a discriminative probabilistic linear discriminant analysis (PLDA) trainer configured to receive the unlabeled training data stored in the unlabeled data storage, the statistics calculated by the statistics calculator, the initial labels stored in the label storage and PLDA parameters stored in a parameter storage, to simultaneously perform an update of the PLDA parameters and the current labels for the unlabeled training data so as to minimize an objective function which is intended to minimize a cost for misrecognition with a regularization term derived from the statistics, and to store the updated PLDA parameters and the updated labels in the parameter storage and the label storage, respectively, the regularization term representing regularization in handling a noisy labeling problem, wherein the calculation by the statistics calculator and the update by the discriminative PLDA trainer are iterated until the discriminative training converges.

* * * * *